(12) United States Patent
Takahashi (10) Patent No.: US 10,194,093 B2
(45) Date of Patent: Jan. 29, 2019

(54) DEVICE AND METHOD FOR CONTINUOUS IMAGE CAPTURING (71) Applicant: Samsung Electronics Co., Ltd., Suwon-si, Gyeonggi-do (KR)

(72) Inventor: Shinri Takahashi, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/518,351

(22) PCT Filed: Aug. 19, 2015

(86) PCT No.: PCT/KR2015/008640
§ 371 (c)(1),
(2) Date: Apr. 11, 2017

(87) PCT Pub. No.: WO2016/076514
PCT Pub. Date: May 19, 2016

(65) Prior Publication Data
US 2017/0310870 A1 Oct. 26, 2017

(30) Foreign Application Priority Data

Nov. 14, 2014 (JP) ................................. 2014-231591
Aug. 11, 2015 (KR) ........................ 10-2015-0113371

(51) Int. Cl.
*H04N 5/235* (2006.01)
*H04N 5/232* (2006.01)
*H04N 5/243* (2006.01)

(52) U.S. Cl.
CPC ........... *H04N 5/2353* (2013.01); *H04N 5/232* (2013.01); *H04N 5/2351* (2013.01);
(Continued)

(58) Field of Classification Search
CPC ........ G06K 9/46; G06K 9/605; G06K 9/6202; H04N 5/23222; H04N 5/907; H04N 5/2353; H04N 5/232; H04N 5/2351; H04N 5/243
See application file for complete search history.

(56) References Cited

U.S. PATENT DOCUMENTS 8,064,762 B2 11/2011 Mizukami et al.
8,169,537 B2 5/2012 Ohki
(Continued)

FOREIGN PATENT DOCUMENTS

JP 2001-211391 A 8/2001
JP 2003-255429 A 9/2003
(Continued)

Primary Examiner — Nicholas G Giles
(74) Attorney, Agent, or Firm — Jefferson IP Law, LLP (57) ABSTRACT

Provided is an imaging apparatus including: an image capturing unit for continuous image capturing including second image capturing and third image capturing; a storage; and a controller for acquiring a first parameter stored in the storage, controlling the image capturing unit to perform the second image capturing based on the first parameter, acquiring a second parameter based on an output signal corresponding to a result of the second image capturing, and controlling storing of the second parameter in the storage, wherein the second parameter is used for image capturing after the third image capturing.

13 Claims, 9 Drawing Sheets

(52) U.S. Cl.
CPC ........... *H04N 5/2352* (2013.01); *H04N 5/243* (2013.01); *H04N 5/23212* (2013.01)

(56) References Cited

U.S. PATENT DOCUMENTS

| | | | |
|---|---|---|---|
| 8,436,930 B2* | 5/2013 | Choi | H04N 5/23248 |
| | | | 348/333.05 |
| 8,593,522 B2 | 11/2013 | Ishii et al. | |
| 8,670,658 B2 | 3/2014 | Ashida | |
| 2001/0048802 A1* | 12/2001 | Nakajima | G06T 11/60 |
| | | | 386/228 |
| 2007/0263112 A1* | 11/2007 | Shinkai | H04N 5/23203 |
| | | | 348/333.01 |
| 2010/0266269 A1* | 10/2010 | Nagao | H04N 5/232 |
| | | | 396/49 |
| 2012/0321131 A1* | 12/2012 | Kobayashi | H04N 1/00183 |
| | | | 382/103 |
| 2013/0342713 A1* | 12/2013 | Cui | H04N 5/23222 |
| | | | 348/207.11 |

FOREIGN PATENT DOCUMENTS

| | | |
|---|---|---|
| JP | 2006-129076 A | 5/2006 |
| JP | 2007-295093 A | 11/2007 |
| JP | 2008-116980 A | 5/2008 |
| JP | 2010-262173 A | 11/2010 |
| KR | 10-2007-0085054 A | 8/2007 |
| KR | 10-2012-0007948 A | 1/2012 |

* cited by examiner

DEVICE AND METHOD FOR CONTINUOUS IMAGE CAPTURING

TECHNICAL FIELD

The present disclosure relates to imaging apparatuses and methods, and more particularly, to imaging apparatuses and methods for continuous image capturing.

BACKGROUND ART

Recently, imaging apparatuses, such as digital cameras, have been improved to increase the speed of continuous shooting. Patent Document 1 (Japanese unexamined patent publication 2006-129076) describes technology that involves performing, in parallel, calculation of operational parameters in photographing based on a recording image signal and transfer of the recording image signal.

Patent Document 2 (Japanese unexamined patent publication 2001-211391) describes performing an exposure operation by using an image signal obtained by one previous exposure. Also, Patent Document 2 describes performing, in continuous shooting, exposure after the second time while overlapping an exposure mode and a signal read-out mode.

Patent Document 3 (Japanese unexamined patent publication 2010-262173) describes setting, in continuous shooting, an aperture value to be the same as that used at the time of exposure for previous image capturing without driving an aperture at the time of capturing an image after the second image capturing.

DETAILED DESCRIPTION OF THE INVENTION

Technical Problem

As described in Patent Document 1, in a digital camera that has no mirror, photometry and exposure operations are performed by using an image signal obtained by an imaging device. For example, an exposure operation is performed by using the previously captured image during continuous shooting, and subsequent image capturing is performed by using a calculated exposure value. In this case, the exposure operation is performed after the captured image is output, and driving of an aperture for subsequent image capturing is performed by using the calculated exposure value after the exposure operation is finished. Due to this, subsequent image capturing may not be performed until driving of the aperture is finished, and thus, a continuous shooting speed decreases.

In order to solve the above problem, imaging apparatuses and methods capable of changing a parameter in image capturing in line with a change in brightness of a subject without sacrificing the continuous shooting speed are provided.

Technical Solution

According to an embodiment, an imaging apparatus includes: an image capturing unit for continuous image capturing including second image capturing and third image capturing; a storage; and a controller for acquiring a first parameter stored in the storage, controlling the image capturing unit to perform the second image capturing based on the first parameter, acquiring a second parameter based on an output signal corresponding to a result of the second image capturing, and controlling storing of the second parameter in the storage, wherein the second parameter is used for image capturing after the third image capturing.

ADVANTAGEOUS EFFECTS OF THE INVENTION

As for an imaging apparatus that performs a photometric operation by using an output signal of an imaging device, an exposure operation may be performed in line with a change in brightness of a subject without decreasing a continuous shooting speed. Also, continuous shooting intervals may be maintained to be constant even without depending on a size of the change in brightness of the subject.

BEST MODE

According to an embodiment, an imaging apparatus includes: an image capturing unit configured to perform continuous image capturing including second image capturing and third image capturing; a storage; and a controller configured to acquire a first parameter stored in the storage, control the image capturing unit to perform the second image capturing based on the first parameter, acquire a second parameter based on an output signal corresponding to a result of the second image capturing, and control storing of the second parameter in the storage, wherein the second parameter is used for image capturing after the third image capturing.

In addition, the continuous image capturing may further include first image capturing prior to the second image capturing, the image capturing unit may perform the first image capturing, and when the first image capturing is performed first in the continuous image capturing, the first parameter may be the same as at least one of parameters used in the first image capturing.

In addition, when the first image capturing is not performed first in the continuous image capturing, the first parameter may be a parameter acquired based on an output signal corresponding to one of a plurality of times image capturing was performed prior to the first image capturing.

In addition, the first parameter and the second parameter may include at least one of brightness of a subject, an exposure value of the imaging apparatus, an aperture value, a shutter speed, and a gain.

In addition, the image capturing unit may include an aperture, a shutter, and an imaging device, and after exposure by the imaging device is completed, the controller may calculate, during an image capturing preparation period for preparing initiation of a subsequent exposure, the aperture value within a range in which driving of the aperture is completed.

In addition, the image capturing preparation period may be from a period initiated earlier to a period finished later from among a period required to transfer the output signal and a charge period for driving the shutter into a charge state capable of performing opening and closing operations of subsequent image capturing.

According to an embodiment, a method of performing continuous image capturing including second image capturing and third image capturing by using an imaging apparatus includes: acquiring a first parameter stored in the imaging apparatus; performing the second image capturing based on the first parameter; acquiring a second parameter based on an output signal corresponding to a result of the second image capturing; storing the second parameter in the imaging apparatus; and performing the third image capturing, wherein the second parameter is used for image capturing after the third image capturing.

In addition, the continuous image capturing may further include first image capturing prior to the second image capturing, wherein the method may further include performing the first image capturing, and when the first image capturing is performed first in the continuous image capturing, the first parameter may be the same as at least one of parameters used in the first image capturing.

In addition, when the first image capturing is not performed first in the continuous image capturing, the first parameter may be a parameter acquired based on an output signal corresponding to one of a plurality of times image capturing was performed prior to the first image capturing.

In addition, the first parameter and the second parameter may include at least one of brightness of a subject, an exposure value of the imaging apparatus, an aperture value, a shutter speed, and a gain.

In addition, after exposure by the imaging apparatus is completed, the aperture value may be calculated, during an image capturing preparation period for preparing initiation of a subsequent exposure, within a range in which driving of an aperture included in the imaging apparatus is completed.

In addition, the image capturing preparation period may be from a period initiated earlier to a period finished later from among a period required to transfer the output signal and a charge period for driving a shutter included in the imaging apparatus into a charge state capable of performing opening and closing operations of subsequent image capturing.

There is provided a computer-readable recording medium having recorded thereon a program for executing, on computer, an imaging method according to an embodiment.

Mode of the Invention

An imaging apparatus according to an embodiment includes a continuous shooting mode in which images are continuously captured while a shutter button is pressed. An imaging apparatus and an imaging method according to an embodiment relate to technology that involves changing parameters in image capturing, such as an aperture value, a shutter speed, and a gain, in line with a change in brightness of a subject without decreasing a continuous shooting speed. The technology disclosed herein may be applied, but is not limited, to digital cameras or smartphones, which require high speed continuous shooting.

Technical problems to be solved will be described below before describing embodiments.

Figure 8:
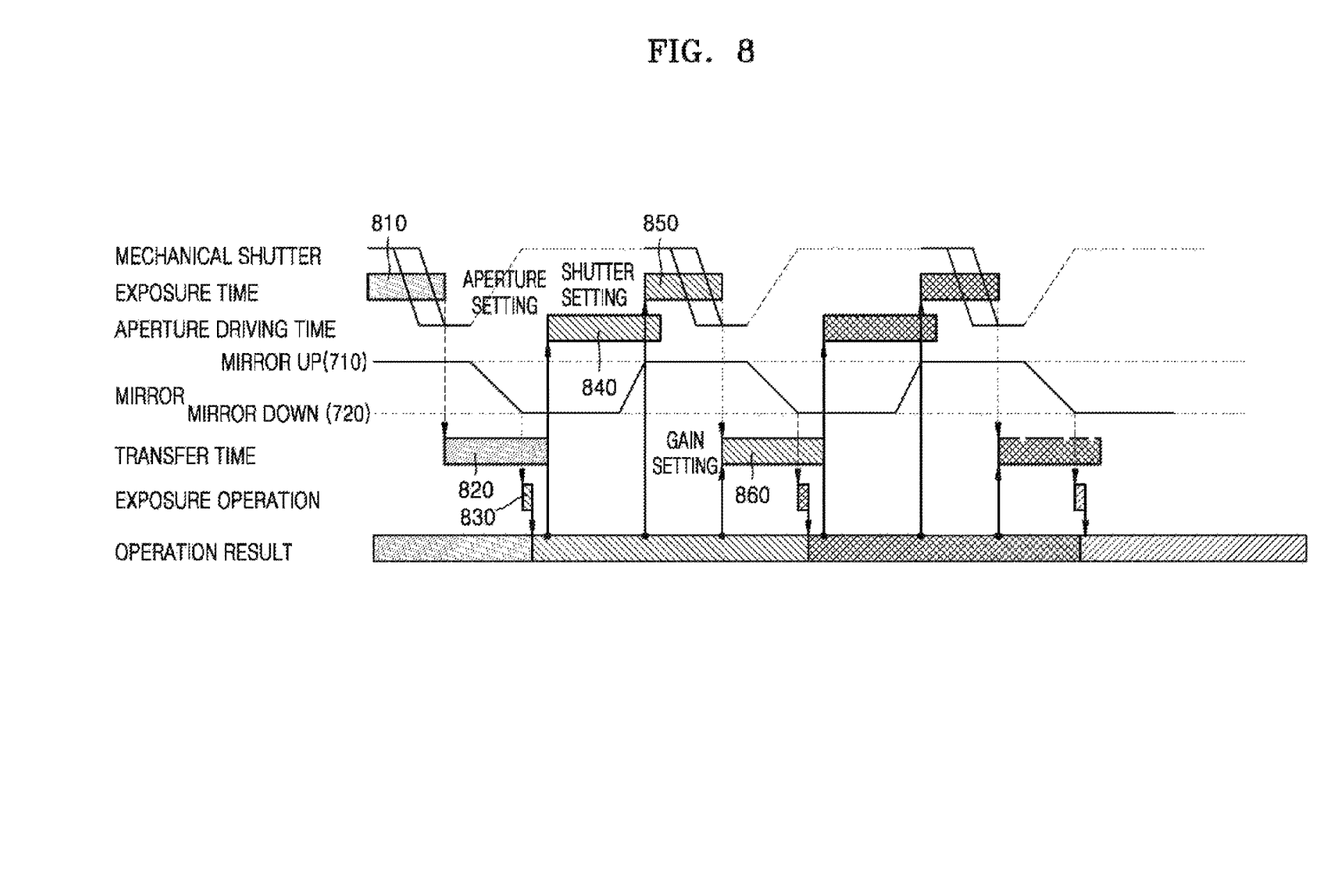
FIG. 8 is a diagram showing an example of driving of an imaging apparatus including a mirror, in chronological order.

First, an example of an imaging method in an imaging apparatus including a mirror will be described with reference to FIG. 8. FIG. 8 shows an order in continuous image capturing of the imaging apparatus including a mirror. In FIG. 8, a period during which a mechanical shutter is open in a mirror-up state corresponds to an exposure time 810. When exposure is finished, transfer of an output signal to front end portion from an imaging device is performed during a transfer time 820.

The imaging apparatus including a mirror may include an independent photometric device for measuring brightness of a subject, independently of the imaging device. In such an imaging apparatus as described above, exposing the imaging device to light may be completed even during transfer of the output signal. Accordingly, upon completing a mirror—down operation, intensity of light may be instantly measured during an exposure operation time 830 to calculate an exposure value of subsequent image capturing (exposure calculation), and a parameter (calculation result) necessary for subsequent image capturing may be determined.

In second image capturing right after first image capturing, an aperture may be driven (set aperture) according to a parameter calculated after the first image capturing, and image capturing may be performed using a shutter speed (set shutter) and a gain (set gain) calculated after the first image capturing.

Figure 9:
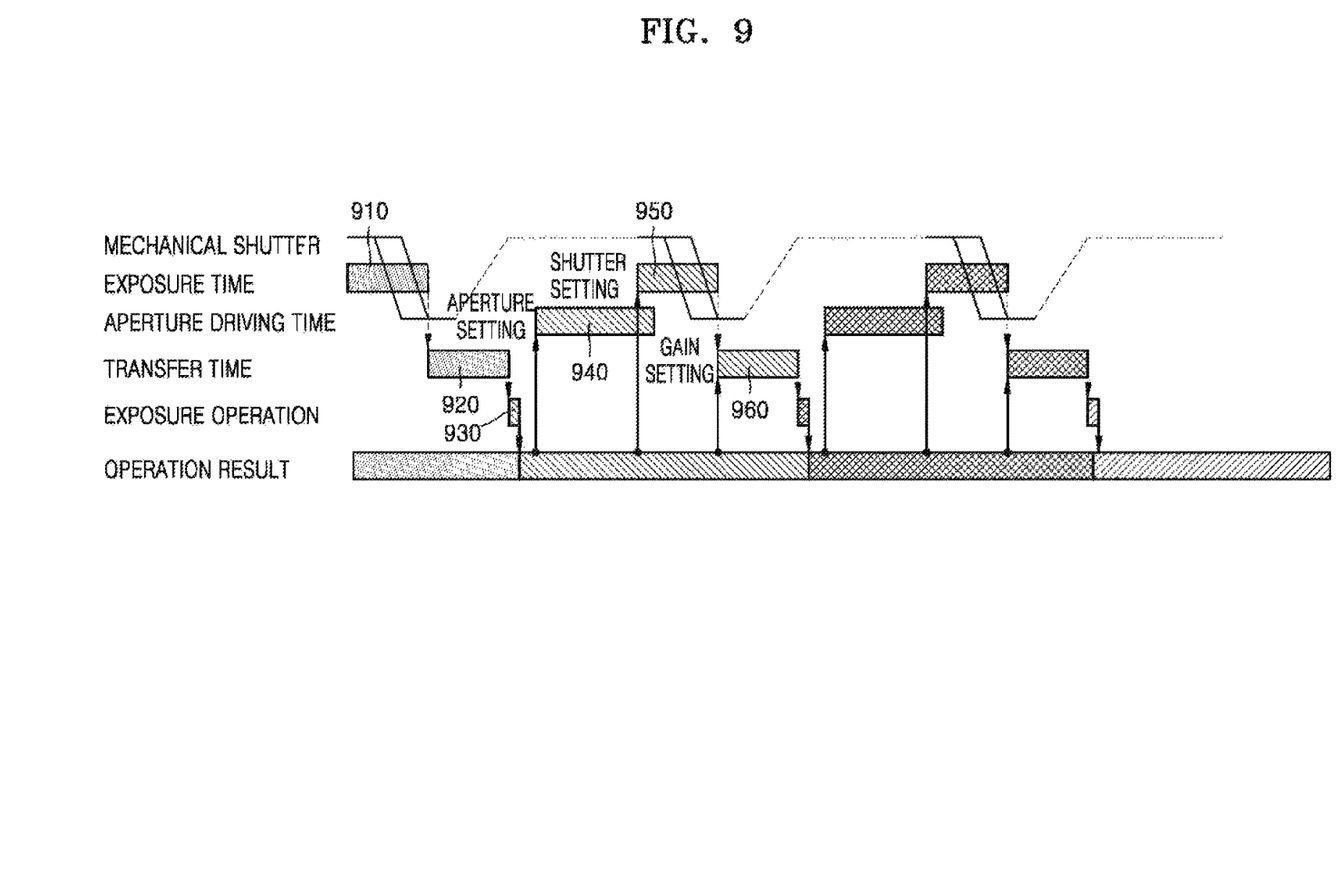
FIG. 9 is a diagram showing an example of driving of an imaging apparatus, in chronological order.

Next, an example of an imaging method in an imaging apparatus including no mirror will be described with reference to FIG. 9. FIG. 9 shows an order in continuous image capturing of the imaging apparatus including no mirror. In the imaging apparatus including no mirror, a photometric operation is performed using an output signal of an imaging device.

The imaging apparatus described above may include a still mode in which every pixel is read out in order to obtain a high-precision still image, and a liveview mode in which, in order to display a liveview before image capturing, pixels of the entire screen are read out at a high speed by thinning the pixels. The photometric operation is often performed using an output signal of the liveview mode. When the liveview mode is operated between still modes in order to change an exposure value in line with a change in brightness of a subject during continuous image capturing, a problem of a decrease in continuous shooting speed occurs.

Accordingly, continuous shooting may be sped up by calculating an exposure value of subsequent image capturing by using an output signal of a recording still mode. As illustrated in FIG. 9, after transfer of the output signal from the imaging device is completed, an exposure value of subsequent image capturing may be calculated (exp. calc.) using the transferred output signal, and a parameter (calc. result) necessary for the very next image capturing may be determined.

In the example illustrated in FIG. 9, after calculation 930 of an exposure value is performed after output of an output signal, setting 940 of an aperture, exposure 950, and setting of a gain are performed. In this case, a transfer time 920 of the output signal from the imaging device, an exposure value calculation time 930, and an aperture driving time 940 are needed, and accordingly, the continuous shooting speed slows down. The technology disclosed herein may achieve high speed continuous shooting by solving the above problem.

Hereinafter, concrete embodiments will be described in detail with reference to the accompanying drawings.

<First Embodiment>

Figure 1:
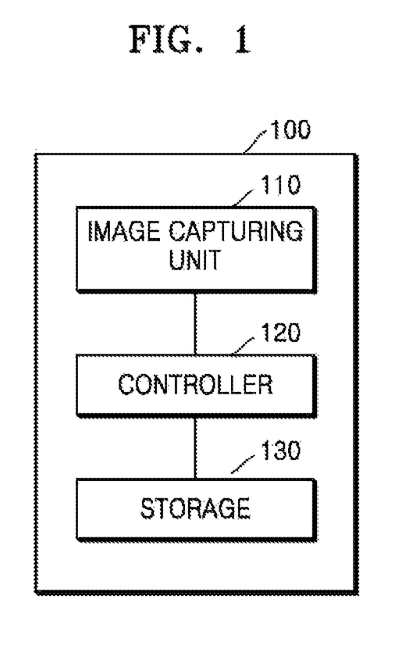
FIG. 1 is a schematic block diagram of an imaging apparatus according to an embodiment.

FIG. 1 is a schematic block diagram of an imaging apparatus 100 according to an embodiment. Referring to FIG. 1, the imaging apparatus 100 may include an image capturing unit 110, a controller 120, and a storage 130. The controller 120 may control the image capturing unit 110 and the storage 130.

The image capturing unit 110 may include an aperture, a shutter, and an imaging device. In an embodiment, the image capturing unit 110 may further include a mirror. The image capturing unit 110 described and shown herein is capable of continuous image capturing.

The storage 130 may be a buffer, a main memory unit, or an auxiliary memory unit. In an embodiment, the storage 130 may be a buffer that temporarily stores a parameter necessary for image capturing. The parameter described herein may include at least one of brightness of a subject, an exposure value of an imaging apparatus, an aperture value, a shutter speed, and a gain.

The controller 120 may obtain a parameter stored in the storage 130. The controller 120 may control the image capturing unit 110 to perform image capturing, based on the parameter obtained from the storage 130. For example, the controller 120 may adjust the aperture and the shutter, based on the aperture value and the shutter speed obtained from the storage 130. Also, the controller 120 may control an image signal obtained from the image capturing unit 110 to be amplified based on the gain obtained from the storage 130. The controller 120 may obtain a parameter necessary for subsequent image capturing, based on the image signal obtained from the image capturing unit 110. The controller 120 may control the obtained parameter to be stored in the storage 130. The parameter obtained by the controller 120 may be used to capture an image after the subsequent image capturing.

Figure 2:
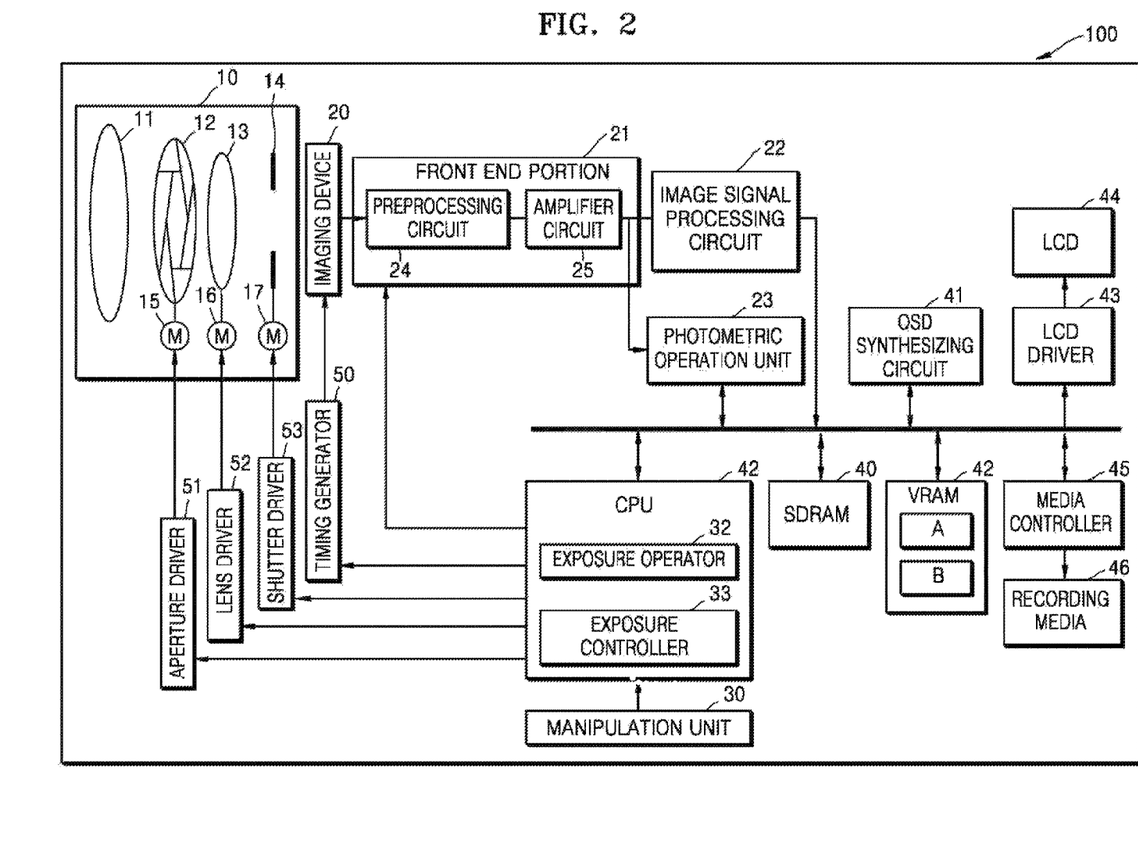
FIG. 2 is a block diagram of configurations of an imaging apparatus according to a first embodiment.

FIG. 2 is a block diagram of configurations of the imaging apparatus 100 according to the first embodiment. As illustrated in FIG. 2, the imaging apparatus 100 according to the first embodiment may include an imaging optical system 10, an imaging device 20, a front end portion 21, an image signal processing circuit 22, a photometric operation unit 23, a manipulation unit 30, a central processing unit (CPU) 31, a synchronous dynamic random access memory (SDRAM) 40, an on-screen display (OSD) synthesizing circuit 41, a video random access memory (VRAM) 42, a liquid crystal display (LCD) driver 43, an LCD 44, a media controller 45, recording media 46, a timing generator 50, an aperture driver 51, a lens driver 52, a shutter driver 53, and so on.

The imaging optical system 10 and the imaging device 20 of FIG. 2 may correspond to the image capturing unit 110 of FIG. 1. The CPU 31 and the photometric operation unit 23 of FIG. 2 may correspond to the controller 120 of FIG. 1. The SDRAM 40 and the VRAM 42 of FIG. 2 may correspond to the storage 130 of FIG. 1.

The imaging optical system 10 includes a zoom lens 11, an aperture 12, a focus lens 13, and a mechanical shutter 14. In the imaging optical system 10, the zoom lens 11, the aperture 12, the focus lens 13, and the mechanical shutter 14 are arranged in this stated order along an optical axis. The imaging optical system 10 may transmit light provided from a subject and focus an image on the imaging device 20.

The zoom lens 11 may face the subject and guide light provided from the subject to the imaging device 20. The aperture 12 adjusts an amount of light incident on the imaging device by adjusting an amount of light (light amount) passing through. The focus lens 13 focuses an image of the subject on an imaging plane of the imaging device 20 by moving along the optical axis. The mechanical shutter 14 may serve as a light-blocking wing.

Also, the imaging optical system 10 includes an aperture driving motor 15, a lens driving motor 16, and a shutter driving motor 17. The aperture driving motor 15 is connected to the aperture 12. The aperture driving motor 15 allows the aperture 12 to change an aperture value and control an exposure amount. The lens driving motor 16 is connected to the focus lens 13. The focus lens 13 is moved along the optical axis by the lens driving motor 16.

The shutter driving motor 17 is connected to the mechanical shutter 14. An exposure time is controlled by closing the mechanical shutter 14 so as to block light when image capturing is not performed, and opening the mechanical shutter 14 to shed light on the imaging device 20 only when image capturing is performed. The mechanical shutter 14 is controlled by the manipulation unit 30 such as a shutter button connected to the CPU 31.

The imaging device 20 is disposed behind the focus lens 13. The imaging device 20 changes an image of the subject focused by the imaging optical system 10 into an electric signal. The imaging device 20 may be, for example, a charge coupled device (CCD) type image sensor or a complementary metal oxide semiconductor (CMOS) type image sensor.

The timing generator 50 is connected to the imaging device 20. The timing generator 50 generates a timing signal for controlling an operation of the imaging device 20. As light provided from the subject is incident within a time during which each pixel of the imaging device 20 is driven according to the timing signal, optical charges are accumulated. Also, the charges accumulated in the imaging device 20 may be read out by the timing signal transmitted from the timing generator 50.

Also, the aperture 12, the focus lens 13, and the mechanical shutter 14 are respectively controlled by the aperture driver 51, the lens driver 52, and the shutter driver 53, and the imaging device 20 is controlled by the CPU 31 via the timing generator 50.

An output signal output from the imaging device 20 is input to the front end portion 21. The front end portion 21 includes a pre-processing circuit 24 and an amplifier circuit 25. The pre-processing circuit 24 generates an image signal that image processing may be performed on in the image signal processing circuit 22, by pre-processing the output signal of the imaging device 20. The amplifier circuit 25 amplifies an input image signal by using a gain calculated by the CPU 31.

The image signal amplified by the amplifier circuit 25 is input to the image signal processing circuit 22 and the photometric operation unit 23. The image signal processing circuit 22 performs various types of image processing operations such as noise reduction, white balance correction, gamma correction, etc. and generates image data such as a liveview image, a still image, etc. The image data that image processing has been performed on is temporarily stored in the VRAM 42, which is a memory for image display. In the example illustrated in FIG. 2, the VRAM 42 includes two memory regions, a storage region A and a storage region B. Each image data stored in the VRAM 42 is updated at every predetermined period.

The OSD synthesizing circuit 41 performs processing for displaying a through image with respect to the LCD 44 according to the image data stored in the VRAM 42. Also, the OSD synthesizing circuit 41 may allow various pieces of information such as a shutter speed, a battery remaining amount, etc. to overlap the through image, thereby displaying the result on the LCD 44. The LCD driver 43 is a display driver for receiving image data from the OSD synthesizing circuit 41 and displaying an image on the LCD 44.

The LCD 44 is an example of a display unit installed in the body of the imaging apparatus 100 and displays, for example, a liveview display before image capturing read out from the VRAM 42, various setting screens, an image recorded by imaging, etc. Also, the display unit is not limited to the LCD 44 and may be an organic electroluminescent (EL) display or the like.

The SDRAM 40 temporarily stores image data of a captured image. The SDRAM 40 has storage capacity for storing a plurality of items of image data. Also, the SDRAM 40 sequentially stores image signals at the time of focus control or stores an operation program of the CPU 31.

The media controller 45 controls recording of image data with respect to the recording media 46 such as a memory card, or reading of image data recorded on the recording media 46. The recording media 46 may be, for example, an optical disc (compact disc (CD), digital versatile disc (DVD), Blu-ray (registered trademark) Disc, etc.), an optical magnetic disc, a semiconductor memory medium, etc.

The CPU 31 may generally control the overall operation of the imaging apparatus 100. The CPU 31 may include an exposure operator 32 and an exposure controller 33. The manipulation unit 30, the timing generator 50, the aperture driver 51, the lens driver 52, and the shutter driver 53 are connected to the CPU 31.

The manipulation unit 30 may include, for example, a shutter button, a power switch, a cross key, a mode dial, etc. installed in the imaging apparatus 100. The manipulation unit 30 transmits a manipulation signal to the CPU 31 according to manipulation by a user. The shutter button may be half-pressed, completely pressed, or released by the user. When the shutter button is half-pressed, a manipulation signal for initiating focus control may be output. When the shutter button is completely pressed, a manipulation signal for initiating image capturing may be output. The imaging apparatus 100 may continuously capture images while the user presses the shutter button.

The photometric operation unit 23 calculates brightness of the subject by using the image signal input from the front end portion 21. For example, the photometric operation unit 23 calculates brightness by accumulating output signals provided from pixels of the imaging device 20 with respect to each predetermined region. The exposure operator 32 calculates parameters for performing exposure control necessary for image capturing, such as an aperture value, a shutter speed, and a gain, according to the brightness of the subject calculated by the photometric operation unit 23.

The shutter speed determined by the exposure operator 32 is used to control the mechanical shutter 14 via the shutter driver 53. Also, the aperture value determined by the exposure operator 32 is used to control the aperture 12 via the lens driver 52. The gain determined by the exposure operator 32 is used to control the amplifier circuit 25. Based on the parameters calculated by the exposure operator 32, the exposure controller 33 controls the aperture 12, the mechanical shutter 14, and a gain of the amplifier circuit 25 and adjusts an exposure amount.

The exposure controller 33 respectively transmits control signals to the aperture driver 51, the lens driver 52, and the shutter driver 53. The aperture driver 51 generates a driving signal according to a control signal received from the exposure controller 33 and drives the aperture driving motor 15. Likewise, the lens driver 52 generates a driving signal according to a control signal received from the exposure controller 33 and drives the lens driving motor 16. Also, the shutter driver 53 generates a driving signal according to a control signal received from the exposure controller 33 and drives the shutter driving motor 17.

Figure 3:
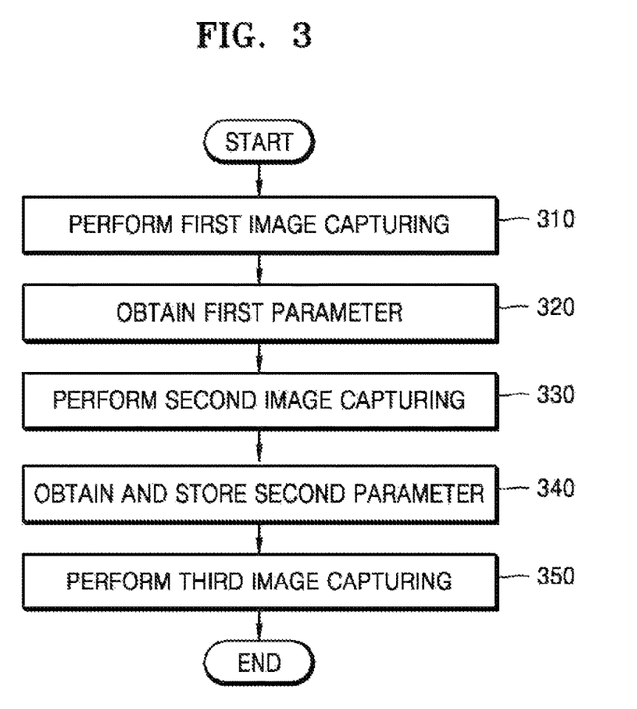
FIG. 3 is a schematic flowchart of an imaging method according to an embodiment.

FIG. 3 is a schematic flowchart of an imaging method according to an embodiment. In FIG. 3, the imaging apparatus 100 may perform continuous image capturing including first image capturing, second image capturing, and third image capturing.

In operation 310, the imaging apparatus 100 may perform the first image capturing. In an embodiment, the first image capturing may be performed first in continuous image capturing. In another embodiment, the first image capturing may not be performed first in continuous image capturing.

In operation 320, the imaging apparatus 100 may obtain a first parameter for the second image capturing. When the first image capturing is performed first in the continuous image capturing, the first parameter may be the same as that used in the first image capturing. When the first image capturing is not performed first in the continuous image capturing, the first parameter may be the one obtained based on an output signal corresponding to one of a plurality of times image capturing was performed prior to the first image capturing.

In operation 330, the imaging apparatus 100 may perform the second image capturing. The imaging apparatus 100 may perform adjustment for the second image capturing by using a parameter obtained in operation 320 as the first parameter. For example, when the first image capturing is performed first in the continuous image capturing, the imaging apparatus 100 may use an aperture value, a shutter speed, and a gain used in the first image capturing as-is. When the first image capturing is not performed first in continuous image capturing, the imaging apparatus 100 may perform adjustment for the second image capturing by using a stored parameter as the first parameter.

In operation 340, the imaging apparatus 100 may obtain a second parameter, based on an output signal corresponding to a result of the second image capturing. For example, the imaging apparatus 100 may determine an exposure value by measuring brightness of a subject of the second image capturing. The imaging apparatus 100 may determine an aperture value, a shutter speed, and a gain, based on the determined exposure value. The imaging apparatus 100 may store the second parameter.

In operation 350, the imaging apparatus 100 may perform the third image capturing. A parameter that is used in the third image capturing may be the one obtained based on an output signal of the first image capturing. In another embodiment, the imaging apparatus 100 may perform the third image capturing by using a parameter obtained based on an output signal corresponding to one of the previous image capturing of the first image capturing.

Figure 4:
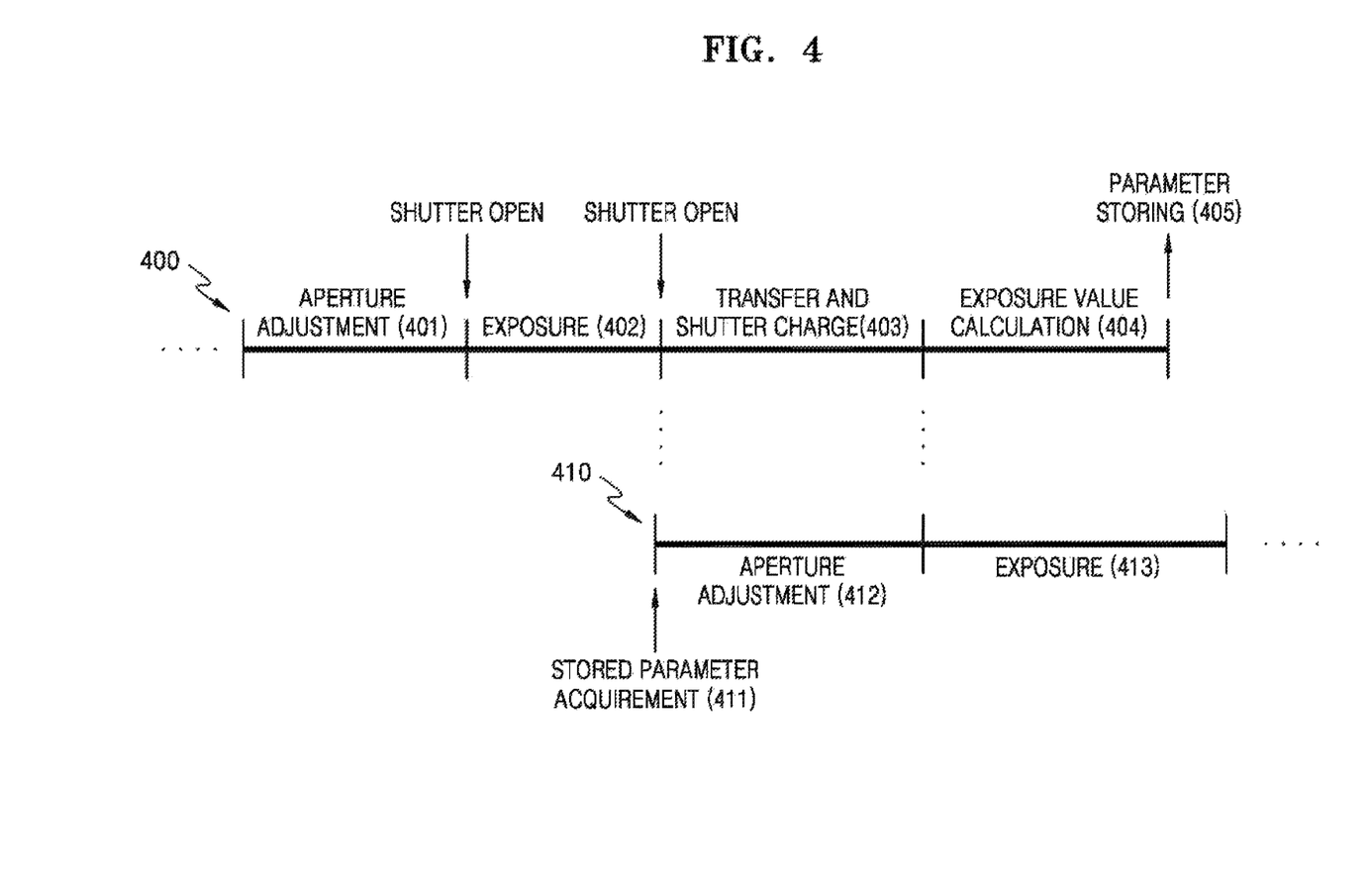
FIG. 4 is a diagram of an example of a continuous image capturing method according to an embodiment.

FIG. 4 is a diagram of an example of a continuous image capturing method according to an embodiment. FIG. 4 illustrates a part of a continuous image capturing process including first image capturing 400 and second image capturing 410 according to a chronological order. Regarding the first image capturing 400, aperture adjustment may be performed first in operation 401. An aperture value necessary for aperture adjustment may be a value stored in the imaging apparatus 100 or a value obtained by the imaging apparatus 100 based on brightness of a subject.

When aperture adjustment is completed, the imaging apparatus 100 may open a shutter and perform exposure in operation 402. Exposure is a process of obtaining an image by exposing the imaging device 20 to external light. The imaging apparatus 100 may finish exposure by closing the shutter after a lapse of time set on a shutter speed.

When operation 402 is completed, the imaging apparatus 100 may perform operation 403. In operation 403, the imaging apparatus 100 may transfer an obtained image as an output signal. Also, the imaging apparatus 100 may perform a shutter charge operation for driving the shutter again. Transfer of the output signal and shutter charge may be performed simultaneously. Accordingly, a period from an operation initiated earlier to an operation finished later from among the two operations may be referred to as an image capturing preparation period for subsequent image capturing.

Also, when operation 402 is finished, the imaging apparatus 100 may start preparing for the second image capturing 410. In operation 411, the imaging apparatus 100 may obtain a parameter for the second image capturing 410. The parameter for the second image capturing 410 may be a parameter stored in the imaging apparatus 100.

In operation 412, the imaging apparatus 100 may perform aperture adjustment. In the present embodiment, in order to rapidly perform continuous image capturing at regular time intervals, a time necessary for aperture adjustment may be shorter than the image capturing preparation period of operation 403. Accordingly, the imaging apparatus 100 may limit a range of an aperture value to set the time necessary for aperture adjustment to be shorter than the image capturing preparation period. The imaging apparatus 100 may make up for the limitation in the range of the aperture value by adjusting a gain and a shutter speed.

In operation 404, the imaging apparatus 100 may calculate, based on the output signal of the first image capturing 400, an exposure value for subsequent image capturing. The exposure value may be calculated based on brightness of the subject. Also, the imaging apparatus 100 may set, based on the exposure value, a parameter including an aperture value, a shutter speed, and a gain necessary for subsequent image capturing. As described above with reference to operation 412, the aperture value may be limited to be set within a range in which an aperture may be adjusted during the image capturing preparation period.

In operation 405, the imaging apparatus 100 may store the parameter. The stored parameter may include at least one of brightness of the subject, an exposure value of the imaging apparatus, an aperture value, a shutter speed, and a gain.

In operation 413, the imaging apparatus 100 may start exposure of second image capturing by opening the shutter. The exposure value calculation of operation 404 and the exposure of operation 413 may be performed simultaneously. By using the method described above, the imaging apparatus 100 may perform continuous image capturing rapidly and uniformly.

Figure 5:
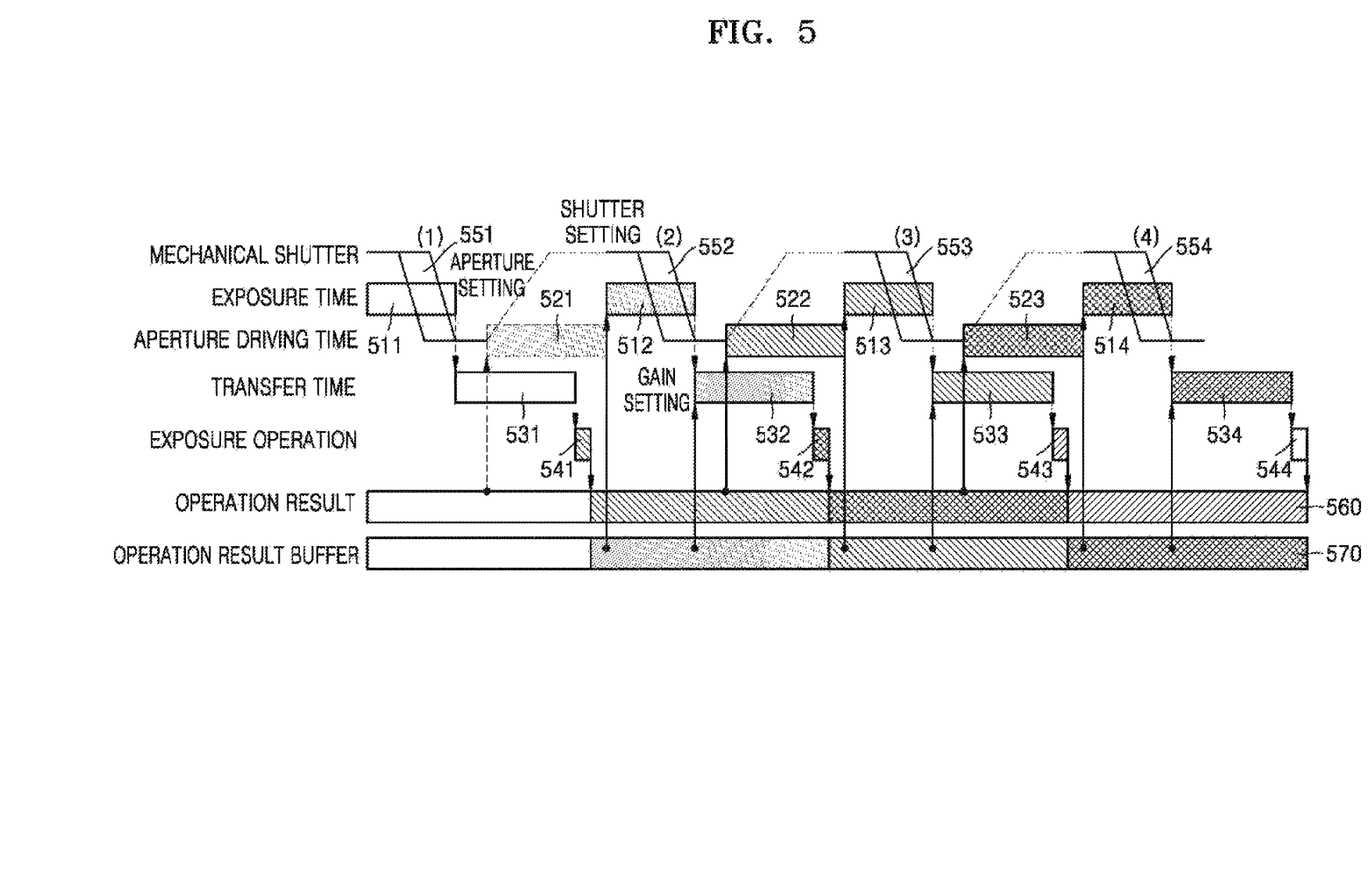
FIG. 5 is a diagram showing driving of an imaging apparatus according to an embodiment, in chronological order.

In the first embodiment, the imaging apparatus 100 may use each parameter calculated at the time of continuous image capturing after subsequent image capturing of the very next image capturing. Hereinafter, an imaging method according to the first embodiment will be described with reference to FIG. 5. FIG. 5 is a diagram showing a sequence in continuous image capturing of an imaging apparatus according to the first embodiment. FIG. 5 illustrates an example in which four times of image capturing from first image capturing 1 to fourth image capturing 4 are continuously performed.

In FIG. 5, "transfer time" 531 to 534 denotes a transfer time of an output signal from the imaging device 20, and "exposure operation" 541 to 544 denotes a time according to the operation. That is, a length of each band illustrating "exposure time" 511 to 514, "aperture driving time" 521 to 523, "transfer time" 531 to 534, and "exposure operation" 541 to 544 denotes a length of time. Also, a time denoted by each parallelogram 551 to 554 of "mechanical shutter" denotes that the mechanical shutter 14 is open. That is, a time denoted by an overlap between a band of "exposure time" 511 to 514 and each parallelogram 551 to 554 of "mechanical shutter" is an exposure time.

Also, in FIG. 5, "operation result" 560 denotes an exposure operation result (each parameter in image capturing) obtained by an exposure operation in the exposure operator 32, and "operation result buffer" 570 denotes a parameter in image capturing, stored in a buffer.

In an embodiment, when a shutter button is pressed long, continuous image capturing may be initiated. First, in the first image capturing 1, image capturing is performed using a predetermined aperture value, a shutter speed, and a gain. When the imaging device 20 is in a driving state, exposure is performed while the mechanical shutter 14 is open.

After the mechanical shutter 14 is closed, an output signal is transferred from the imaging device 20 exposed to light in the first image capturing 1. After transfer of the output signal is completed, the photometric operation unit 23 performs a photometric operation by using the output signal, and the exposure operator 32 performs an exposure operation according to a result of the photometric operation.

In this regard, an exposure operation result (each parameter such as an aperture value, a shutter speed, and a gain) calculated according to the output signal of the first image capturing 1 is not applied to the second image capturing 2 right after the first image capturing 1 but is applied after the third image capturing 3 subsequent to the second image capturing 2.

In the example illustrated in FIG. 5, the exposure operation result calculated according to the output signal of the first image capturing 1 is applied to the third image capturing 3. That is, in FIG. 5, the exposure operation result by the first image capturing 1, denoted by a bottom right diagonal line, is applied to setting of an aperture, a shutter speed, and a gain of the third image capturing 3. Due to this, setting of the aperture 12 for the third image capturing 3 may be performed during transfer of an output signal of the imaging device 20 exposed to light in the second image capturing 2.

As illustrated in FIG. 5, during driving of the aperture 12 for the third image capturing 3, transfer of the output signal from the imaging device 20 exposed to light in the second image capturing 2 is completed, and an exposure operation is performed according to the output signal. Thus, the exposure operation result by the first image capturing 1 is updated as an exposure operation result by the second image capturing 2.

Due to this, the exposure operation result by the first image capturing 1 is buffered. In addition, the shutter speed and the gain in the third image capturing 3 are set using the buffered exposure operation result by the first image capturing 1.

Also, the exposure operation result calculated according to the output signal of the second image capturing 2 is not applied to the third image capturing 3 right after the second image capturing 2 but is applied to the fourth image capturing 4 subsequent to the third image capturing 3. That is, in FIG. 5, the exposure operation result by the second image capturing 2, denoted by diagonal lattice, is applied to setting of an aperture, a shutter speed, and a gain of the fourth image capturing 4.

Accordingly, setting of the aperture 12 for the fourth image capturing 4 may be performed during transfer of an output signal of the imaging device 20 exposed to light in the third image capturing 3. In addition, the shutter speed and the gain in the fourth image capturing 4 are set using the exposure operation result by the second image capturing 2, which is buffered.

As described above, the photometric operation unit 23 calculates brightness of a subject by accumulating output signals provided from the entire pixels of the imaging device 20. Accordingly, in an example illustrated in FIG. 9, after transfer of output signals from the entire pixels of the imaging device 20 at the time of the very previous image capturing is completed, an exposure operation may be performed by the exposure operator 32. In order to perform driving of an aperture for subsequent image capturing by using an exposure operation result, a time resulting from adding a transfer time of output signals from the entire pixels of the imaging device 20 to a driving time of the aperture is required. Accordingly, increasing continuous shooting speed may be limited.

In this regard, in the first embodiment, during transfer of an output signal of the very previous image capturing, driving of an aperture of subsequent image capturing may be performed. Thus, parameters in image capturing, such as an aperture value, a shutter speed, and a gain, may be changed in line with a change in brightness of the subject without sacrificing continuous shooting speed.

Each parameter in the second image capturing 2 right after the first image capturing 1, which is the first in continuous image capturing, will be described below. As illustrated by dots in FIG. 5, the same parameters as those used in the first image capturing 1, which is the first in continuous image capturing, may be used in the second image capturing 2. That is, exposure of the first image capturing 1 and exposure of the second image capturing 2 may be the same as each other. It does not constitute a special problem in image capturing because an interval between the first image capturing 1 and the second image capturing 2 is short, and in general, a significant change in brightness of the subject rarely occurs therebetween.

An aperture value in the second image capturing 2 is the same as an aperture value in the first image capturing 1, and the aperture is not driven in the second image capturing 2. Accordingly, a time for driving the aperture is not required between the first image capturing 1 and the second image capturing 2, and thus, continuous shooting speed may be prevented from decreasing.

Also, regarding the second image capturing 2, only the aperture value may be the same as that in the first image capturing 1. On the condition that the aperture value of the second image capturing 2 is the same as that of the first image capturing 1, the shutter speed and the gain of the second image capturing 2 may be set using the exposure operation result calculated by using the output signal of the first image capturing 1. Thus, even in the second image capturing 2, an exposure amount may be changed according to brightness of the subject without decreasing continuous shooting speed.

Although, in the above example, each parameter calculated according to the output signal of the first image capturing 1 is applied to the third image capturing 3, the parameter may be applied to image capturing which is performed after the third image capturing 3.

In continuous image capturing, maintaining intervals of continuous image capturing constantly is also important. If a change in brightness is large or small during continuous image capturing, a change amount of an aperture may be non-uniform. When the change amount of the aperture is large, an aperture driving time produces a bottleneck, and intervals of continuous image capturing increases as much as the coma period.

Accordingly, in the first embodiment, after exposure by the imaging device 20 is completed at the time of continuous image capturing, during an image capturing preparation period for preparing the initiation of subsequent exposure, an aperture value is calculated within a range in which driving of the aperture 12 is completed. An image capturing preparation period for driving the aperture 12 will be described with reference to FIG. 6.

Figure 6:
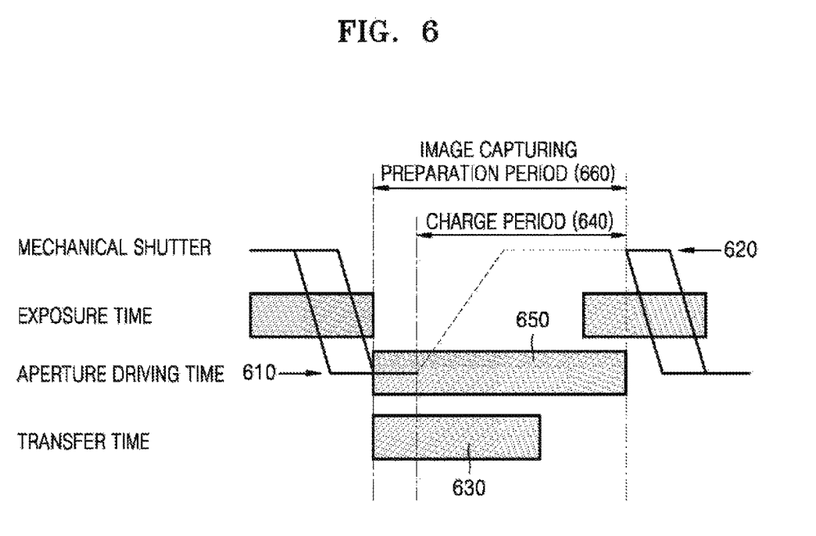
FIG. 6 is a diagram of an image capturing preparation period according to an embodiment.

As illustrated in FIG. 6, the imaging device 20 initiates transfer of an output signal when the mechanical shutter 14 is in a closed state (light blocking state) 610. Also, when the very previous image capturing is finished, the mechanical shutter 14 initiates a preparation operation (charge operation) for coming into an open state 620 for subsequent image capturing while the mechanical shutter 14 is closed. In order to initiate subsequent image capturing, both of the transfer of the output signal from the imaging device 20 and the charge operation of the mechanical shutter 14 have to be completed. That is, until these operations are completed, driving of the aperture 12 has no influence on continuous shooting intervals.

Accordingly, an image capturing preparation period 660 refers to a period from a period initiated earlier to a period finished later from among a transfer period 630 of an output signal from the imaging device 20 and a charge period 640 for driving the mechanical shutter 14 into a charge state capable of performing open and closed operations of subsequent image capturing. Also, the image capturing preparation period is determined only by the mechanical shutter 14 and the imaging device 20. For example, the image capturing preparation period may be determined only based on a charge period of the mechanical shutter 14 and a transfer period of an output signal from the imaging device 20.

In the present embodiment, the image capturing preparation period 660 is determined as a setting period 650 of the aperture 12 to prevent continuous shooting intervals from being increased by driving of an aperture. That is, an aperture value is limited to complete driving of the aperture 12 within an image capturing preparation period of the very previous image capturing and subsequent image capturing.

A time required for driving of the aperture 12 between random aperture values may be previously calculated. The exposure operator 32 calculates a limit aperture value for completing driving of the aperture 12 within an image capturing preparation period from a current aperture value.

As described above, the exposure operator 32 calculates an aperture value, a shutter speed, and a gain by using brightness of a subject, calculated in the photometric operation unit 23, and when the result is greater than the limit aperture value, the aperture value is limited to the limit aperture value. When the limit aperture value is used, a desired exposure amount may be realized by changing the shutter speed and the gain. Thus, even when brightness of the subject changes significantly during continuous image capturing, each parameter may be changed in line with brightness of the subject without decreasing continuous shooting speed.

For example, regarding the exposure operator 32, an exposure value is calculated as EV=11(ISO100), an aperture value is calculated as AV=5(F5.6), a shutter speed is calculated as TV=7(1/128s), and a gain is calculated as SV=6

(ISO200). In this regard, a current aperture value is assumed as AV=2(F2.0), and a limit aperture value is assumed as AV=4(F4.0).

In this case, the exposure operator 32 limits the aperture value to AV=4(F4.0) of the limit aperture value, and changes, for example, the gain to SV=5(ISO100). Thus, EV(ISO100)=AV+TV+5−SV=4+7+5−5=11 may be satisfied, and even through the aperture value is limited, exposure may be performed using the same exposure value.

As described above, continuous shooting intervals may be constantly maintained by limiting an aperture value to complete, within an image capturing preparation period, driving of an aperture for performing subsequent image capturing.

<Second Embodiment>

An imaging apparatus according to the second embodiment is obtained by applying the technology disclosed herein to a digital single lens reflex (DSLR) camera including a mirror. Also, configurations of the imaging apparatus according to the second embodiment are the same as those illustrated in FIG. 2 except that the imaging apparatus according to the second embodiment includes a finder optical system including a quick return mirror, a finder screen, a pentaprism, an eyepiece optical system, etc., and thus, repeated descriptions thereof will be omitted below.

The quick return mirror is disposed between the focus lens 13 and the mechanical shutter 14. A light path of an image of a subject condensed by the focus lens 13 is bent towards the finder screen by the quick return mirror. The quick return mirror is installed so as to be capable of operating in the imaging optical system 10. The quick return mirror is moved back to a location where incidence of light of the subject on the imaging device 20 is not interrupted, according to manipulation of a shutter button.

The finder screen focuses the image of the subject reflected by the quick return mirror. The pentaprism leads the image focused on the finder screen as an erect image to the eyepiece optical system. The eyepiece optical system is an optical system for observing the image of the subject, which has become the erect image due to the pentaprism, under magnification. Also, configurations of the finder optical system are not limited to the present embodiment.

Figure 7:
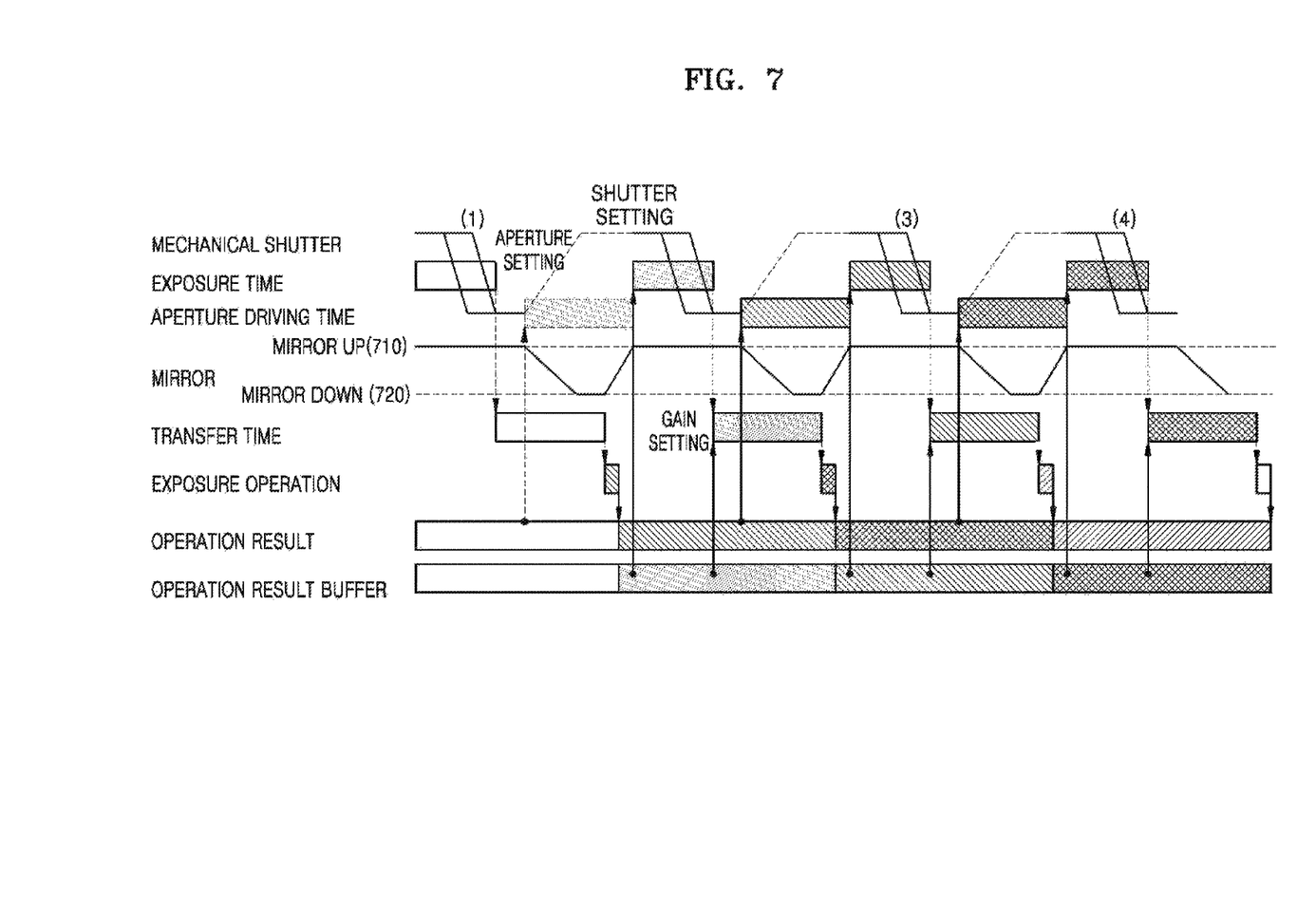
FIG. 7 is a diagram showing driving of an imaging apparatus including a mirror, according to an embodiment, in chronological order.

An imaging method according to the second embodiment will be described with reference to FIG. 7. FIG. 7 is a diagram showing a sequence in continuous image capturing of the imaging apparatus according to the second embodiment. FIG. 7 illustrates an example in which four times of image capturing from first image capturing 1 to fourth image capturing 4 are continuously performed. "Mechanical shutter", "exposure time", "aperture driving time", "transfer time", "exposure operation", "operation result", and "operation result buffer" shown in FIG. 7 are the same as those described with reference to FIG. 5, and thus, repeated descriptions thereof will be omitted below.

In FIG. 7, "mirror" denotes a state of the quick return mirror. "Mirror up" 710 denotes a state in which the quick return mirror is moved back to a location where incidence of light of a subject on the imaging device 20 is not interrupted. "Mirror down" 720 denotes a state in which the quick return mirror is disposed between the focus lens 13 and the mechanical shutter 14.

When a shutter button is pressed long, continuous image capturing is initiated. First, in the first image capturing 1, the mirror becomes up, and image capturing is performed using a predetermined aperture value, a shutter speed, and a gain. When the imaging device 20 is in a driving state, exposure is performed while the mechanical shutter 14 is open.

After the mechanical shutter 14 is closed, an output signal is transferred from the imaging device 20 exposed to light in the first image capturing 1. After transfer of the output signal is completed, the photometric operation unit 23 performs a photometric operation by using the output signal, and the exposure operator 32 performs an exposure operation according to a result of the photometric operation.

An exposure operation result calculated according to the output signal of the first image capturing 1 is not applied to the second image capturing 2 right after the first image capturing 1 but is applied after the third image capturing 3 subsequent to the second image capturing 2. In the example illustrated in FIG. 7, the exposure operation result calculated according to the output signal of the first image capturing 1 is applied to the third image capturing 3. Also, an exposure operation result calculated according to an output signal of the second image capturing 2 is not applied to the third image capturing 3 but is applied to the fourth image capturing 4 subsequent to the third image capturing 3.

As in an example illustrated in FIG. 8, when photometry is performed using a photometric device mounted on an optical finder-side, an exposure operation may not be performed and driving of an aperture for subsequent image capturing may not be initiated until mirror down is completed and a photometric value is obtained.

In this regard, according to the second embodiment, driving of an aperture for subsequent image capturing may be initiated before mirror down is completed. That is, even when the technology disclosed herein is applied to the DSLR camera including a mirror, a continuous shooting time may be reduced.

As described above, in the second image capturing 2 right after the first image capturing 1, which is the first in continuous image capturing, the same parameters as those used in the first image capturing 1, which is the first in continuous image capturing, may be used. Also, regarding the second image capturing 2, only an aperture value may be the same as that in the first image capturing 1. On the condition that the aperture value of the second image capturing 2 is the same as that of the first image capturing 1, a shutter speed and a gain of the second image capturing 2 may be set using the exposure operation result calculated by using the output signal of the first image capturing 1.

Also, even in the second embodiment, as illustrated in FIG. 6, an aperture value may be limited to complete driving of the aperture 12 within an image capturing preparation period of the very previous image capturing and subsequent image capturing.

As described above, according to one or more embodiments, in an imaging apparatus that performs a photometric operation by using an output signal of an imaging device, an exposure operation may be performed in line with a change in brightness of a subject even without decreasing continuous shooting speed. Also, continuous shooting intervals may be constantly maintained without depending on a size of the change in brightness of a subject.

Also, the technology disclosed herein is not limited to the one or more embodiments and may be properly changed without departing from the intent of the present disclosure.

Although, in the embodiments described above, hardware configurations have been mainly described, the embodiments are not limited thereto, and processing may be realized by executing a computer program via a central processing unit (CPU). In this case, the computer program may be housed and be supplied to a computer, using various types of non-transitory computer-readable media. Non-transitory computer-readable media include various types of tangible storage media.

Examples of the non-transitory computer-readable media include magnetic recording media (for example, flexible disks, magnetic tapes, hard disk drive), magnet-optical recording media (for example, optical magnetic disks), compact disc read-only memory (CD-ROM), compact disc recordable (CD-R), compact disc rewritable (CD-R/W), and semiconductor memory (for example, mask ROM, programmable ROM (PROM), erasable PROM (EPROM), flash ROM, random access memory (RAM)). In addition, the program may be supplied to the computer by various types of transitory computer-readable media. Examples of transitory computer-readable media include electrical signals, optical signals, and electromagnetic waves. The transitory computer-readable media may supply the program to the computer via wired channels such as electric wires and optical fiber, or wireless channels.

The invention claimed is:

1. An imaging apparatus comprising:
    an image sensor configured to perform continuous image capturing comprising first image capturing, second image capturing, and third image capturing;
    at least one memory; and
    at least one processor configured to:
        acquire a first parameter stored in the at least one memory,
        control the image sensor to perform the second image capturing based on the first parameter,
        determine a second parameter based on an output signal corresponding to a result of the second image capturing, and
        control storing of the second parameter in the at least one memory,
    wherein the first image capturing, the second image capturing, and the third image capturing are sequentially performed by the image sensor in the continuous image capturing, and
    wherein the second parameter is not used for the third image capturing and is used for image capturing after the third image capturing.

2. The imaging apparatus of claim 1,
    wherein the first image capturing occurs prior to the second image capturing,
    wherein the image sensor performs the first image capturing, and
    wherein, when the first image capturing is performed first in the continuous image capturing, the first parameter is at least one of parameters used in the first image capturing.

3. The imaging apparatus of claim 2, wherein, when previous image capturing in the continuous image capturing is performed before the first image capturing in the continuous image capturing, the first parameter is a parameter acquired based on an output signal corresponding to the prior image capturing in the continuous image capturing.

4. The imaging apparatus of claim 1, wherein the first parameter and the second parameter comprise at least one of brightness of a subject, an exposure value of the imaging apparatus, an aperture value, a shutter speed, or a gain.

5. The imaging apparatus of claim 4,
    wherein the image sensor comprises an aperture, a shutter, and an imaging device, and
    wherein after exposure by the imaging device is completed, the at least one processor calculates, during an image capturing preparation period for preparing initiation of a subsequent exposure, the aperture value within a range in which driving of the aperture is completed.

6. The imaging apparatus of claim 5, wherein the image capturing preparation period comprises a period to transfer the output signal and a charge period for driving the shutter into a charge state capable of performing opening and closing operations for subsequent image capturing from among the continuous image capturing.

7. A method of performing continuous image capturing comprising first image capturing, second image capturing, and third image capturing, by using an imaging apparatus, the method comprising:
    acquiring, by at least one processor, a first parameter stored in the imaging apparatus;
    controlling, by the at least one processor, the second image capturing based on the first parameter;
    determining, by the at least one processor, a second parameter based on an output signal corresponding to a result of the second image capturing;
    storing, by at least one memory, the second parameter in the imaging apparatus; and
    controlling, by the at least one processor, the third image capturing,
    wherein the first image capturing, the second image capturing, and the third image capturing are sequentially performed by the imaging apparatus in the continuous image capturing, and
    wherein the second parameter is not used for the third image capturing and is used for image capturing after the third image capturing.

8. The method of claim 7,
    wherein the first image capturing occurs prior to the second image capturing,
    wherein the method further comprises performing the first image capturing, and
    wherein, when the first image capturing is performed first in the continuous image capturing, the first parameter is the same as at least one of parameters used in the first image capturing.

9. The method of claim 8, wherein, when previous image capturing in the continuous image capturing is performed before the first image capturing in the continuous image capturing, the first parameter is a parameter acquired based on an output signal corresponding to the prior image capturing in the continuous image capturing.

10. The method of claim 7, wherein the first parameter and the second parameter comprise at least one of brightness of a subject, an exposure value of the imaging apparatus, an aperture value, a shutter speed, or a gain.

11. The method of claim 10, wherein, after exposure by the imaging apparatus is completed, the aperture value is calculated, during an image capturing preparation period for preparing initiation of a subsequent exposure, within a range in which driving of an aperture comprised in the imaging apparatus is completed.

12. The method of claim 11, wherein the image capturing preparation period comprises a period to transfer the output signal and a charge period for driving a shutter comprised in the imaging apparatus into a charge state capable of performing opening and closing operations for subsequent image capturing from among of the continuous image capturing.

13. A non-transitory computer-readable recording medium configured to store one or more computer programs including instructions that, when executed by at least one processor, cause the at least one processor to perform the method of claim 7.

* * * * *